United States Patent [19]
Eaton

[11] Patent Number: 5,580,099
[45] Date of Patent: Dec. 3, 1996

[54] QUICK CONNECT/DISCONNECT COUPLING

[76] Inventor: Edward M. Eaton, P.O. Box 548, Broomfield, Colo. 80038

[21] Appl. No.: 415,550
[22] Filed: Apr. 3, 1995
[51] Int. Cl.$^6$ ............................................. F16L 37/24
[52] U.S. Cl. ........................ 285/35; 285/322; 285/396
[58] Field of Search ................................ 285/322, 243, 285/35, 396, 323

[56] References Cited

U.S. PATENT DOCUMENTS

| | | |
|---|---|---|
| 520,952 | 6/1894 | Cox . |
| 2,259,137 | 10/1941 | Iftiger, Sr. . |
| 2,327,714 | 8/1943 | Iftiger, Sr. .................... 285/35 |
| 3,870,332 | 3/1975 | Eaton ............................ 285/322 |
| 4,191,406 | 3/1980 | Eaton ............................ 285/322 |
| 4,212,487 | 7/1980 | Jones et al. .................. 285/243 |

*Primary Examiner*—Terry Lee Melius
*Assistant Examiner*—Heather Shackelford
*Attorney, Agent, or Firm*—Plante & Strauss

[57] ABSTRACT

There is disclosed a quick connect/disconnect coupling for tubular elements such as hoses and the like, which uses a plurality of articulated jaws, with a retainer and a retainer clip. In this invention, each of the jaws has an axial groove extending from its inner edge, and the retainer sleeve has pins which extend into the grooves of the jaws. The axial groove in each jaw has a stepped width, with a greater width at the inner edge of said jaw, thereby permitting a limited rotational movement of said ring between its rearward and forward positions. The retainer sleeve also has an inner annular groove adjacent its inner face which receives a retainer clip to secure the assembly.

8 Claims, 4 Drawing Sheets

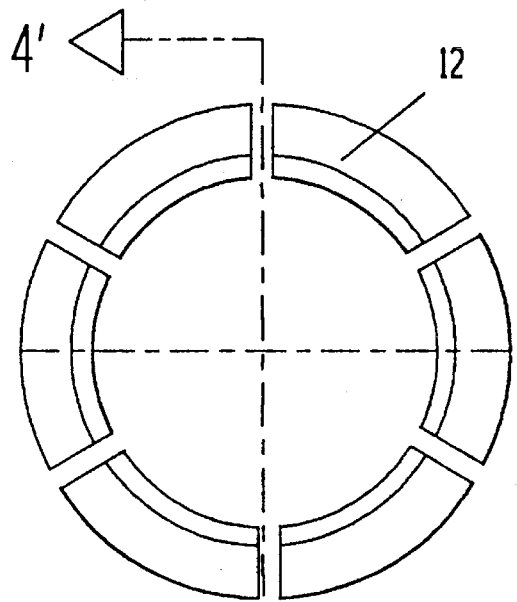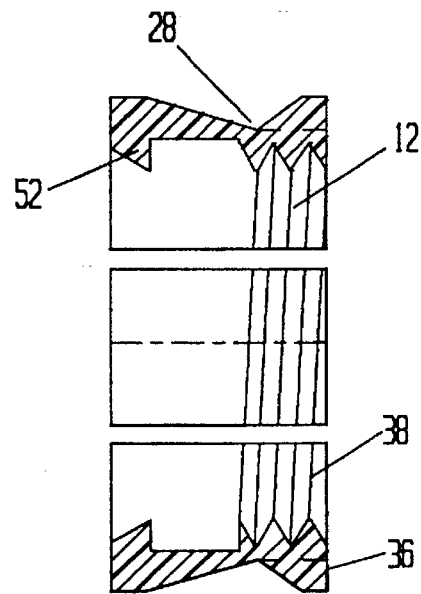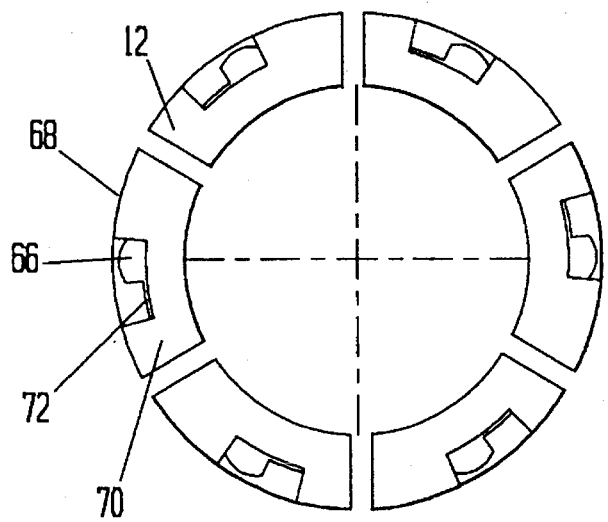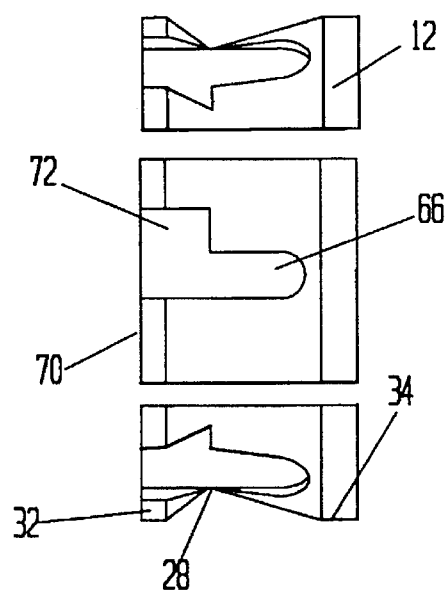

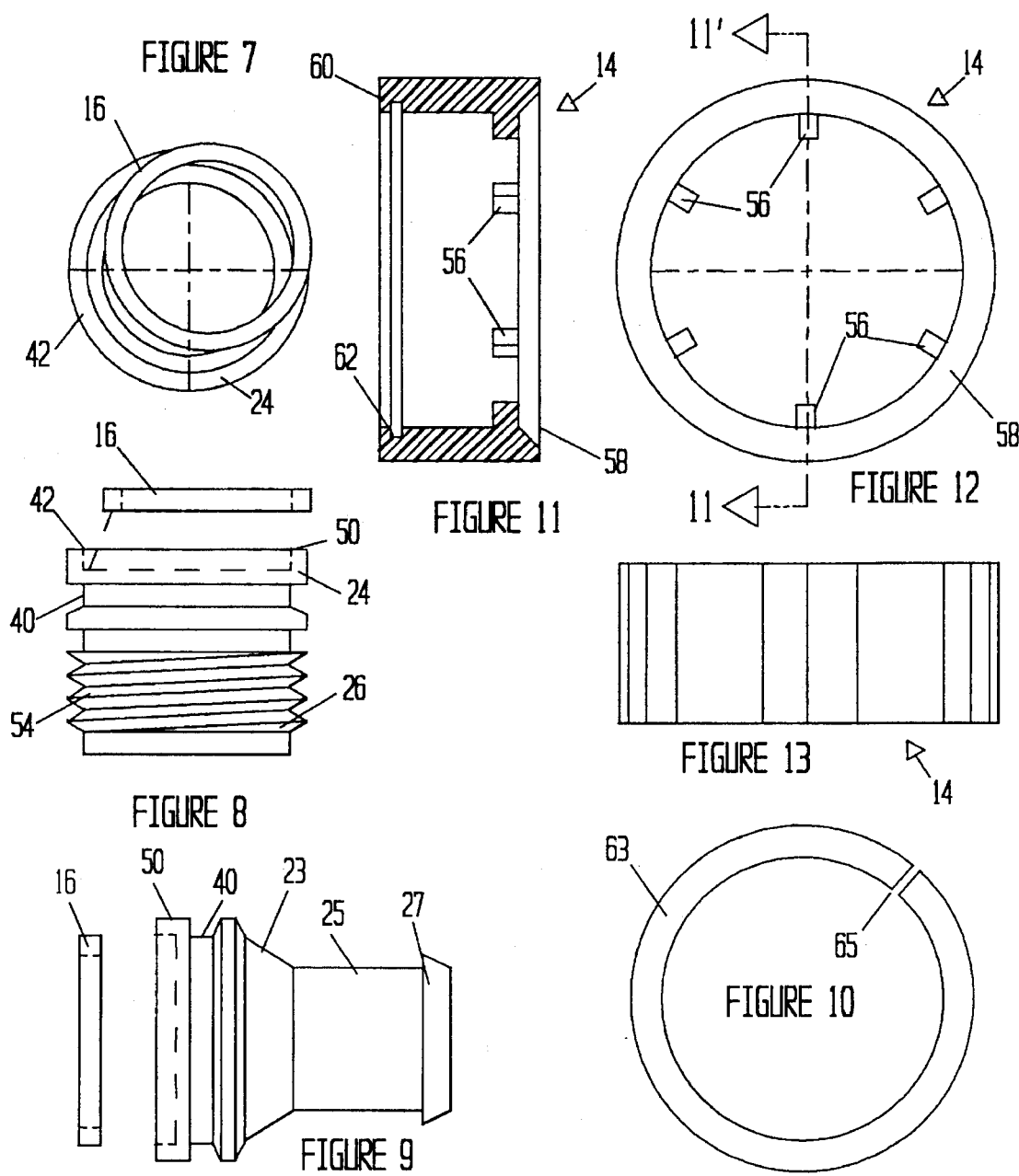

QUICK CONNECT/DISCONNECT COUPLING

BACKGROUND OF THE INVENTION

1. Field of the Invention

This invention relates to a quick connecting coupling for tubular members and in particular to a low cost, quick connecting coupling.

2. Brief Statement of the Prior Art

There have been number of attempts to provide a quick connecting hose coupling. In my pat., U.S. Pat. No. 3,870,332, I disclosed a quick coupling that has a sufficiently positive action to permit its use for fire fighting equipment. The coupling of my prior patent has segmented jaws pivotally carried by a body member and moveable between expanded and contracted positions in response to axial displacement of an outer cam ring having an arcuate cam guide which opens the jaws of the coupling into their expanded positions. The coupling represented a significant improvement as it did not rely on cumbersome and failure-prone internal springs or other resilient members used in prior devices of U.S. Pat. Nos. 2,327,714; 2,259,137; 686,389; and 520,952; and German Pat. No. 842,436.

In my prior patent, U.S. Pat. No. 4,191,406, I disclosed an improved quick coupling with a cam ring which has a cam with a leading edge that is beveled to mate with the leading cam surfaces of the jaw during closing of the jaws and a trailing edge which is beveled at the angle of the trailing cam surfaces of the jaw segments to mate with the latter during opening of the segments. The cam ring is limited in its axial travel by pins which project into receiving, substantially axial grooves on the outer surfaces of the jaws.

My prior patents provided a quick coupling with positive opening and closing actions which were sufficiently reliable to meet requirements for use in emergency fire services. The couplings, however, were difficult to assemble, resulting in costs which limited their widespread use, particularly for use with home gardening hoses.

OBJECTIVES OF THE INVENTION

It is an objective of this invention to provide a quick connect/disconnect coupling for hoses and other tubular members.

It is also an objective of this invention to provide a quick connect/disconnect coupling that is simple to assemble.

It is likewise an objective of this invention to provide a quick connect/disconnect coupling which is inexpensive and suited for consumer use.

Other and related objectives will be apparent from the following description of the invention.

BRIEF STATEMENT OF THE INVENTION

This invention comprises a quick connect/disconnect coupling for tubular elements such as hoses and the like, which uses a plurality of articulated jaws, as in my prior patents, but which has a retainer and assembly retainer. In this invention, each of the jaws has an axial groove extending from its inner edge of said jaw, and the retainer sleeve has pins which extend into the grooves of the jaws. The axial groove in each jaw has a stepped width, with a greater width at the inner edge of said jaw, thereby permitting a limited rotational movement of said ring between its rearward and forward positions. The retainer sleeve also has an inner annular groove adjacent its inner face which receives a retainer ring to secure the assembly.

DESCRIPTION OF THE DRAWINGS

The invention will be described with reference to the figures of which:

FIGS. 3 to 6 are views of the jaw segments used in the quick connect/diSConnect coupling of the invention;

FIGS. 7 and 8 are views of the body of the quick connect/disconnect coupling of the invention;

FIG. 9 is a side view of an alternative body useful in the quick connect/disconnect coupling of the invention;

FIG. 10 is a view of a retainer useful with the quick connect/disconnect coupling of the invention;

FIGS. 11 to 13 are views of the retainer sleeve of the quick connect/disconnect coupling of the invention.

DESCRIPTION OF PREFERRED EMBODIMENTS

Figure 1:
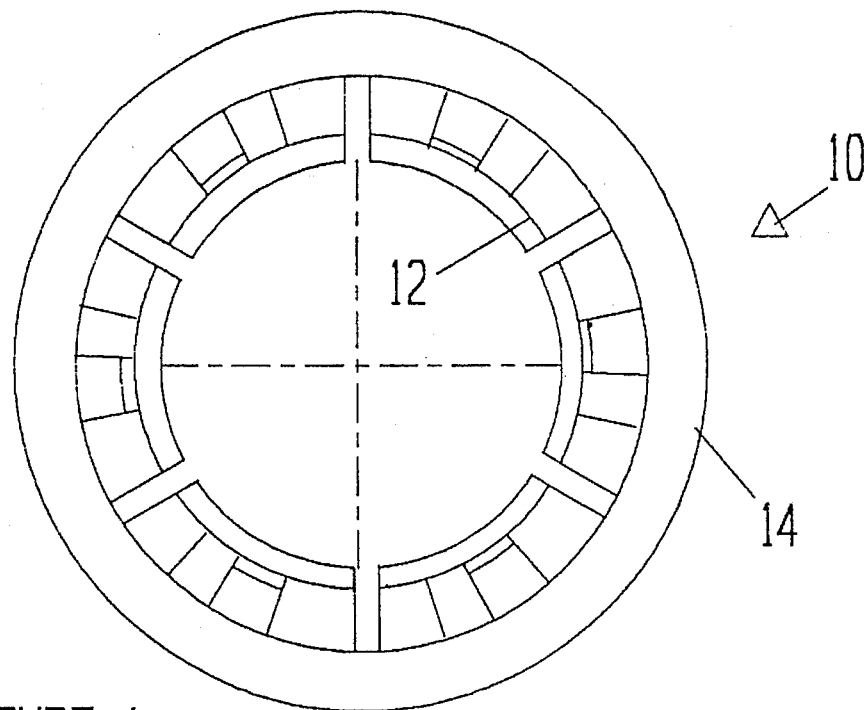
FIG. 1 is an end view of the quick connect/disconnect coupling of the invention.
Figure 2:
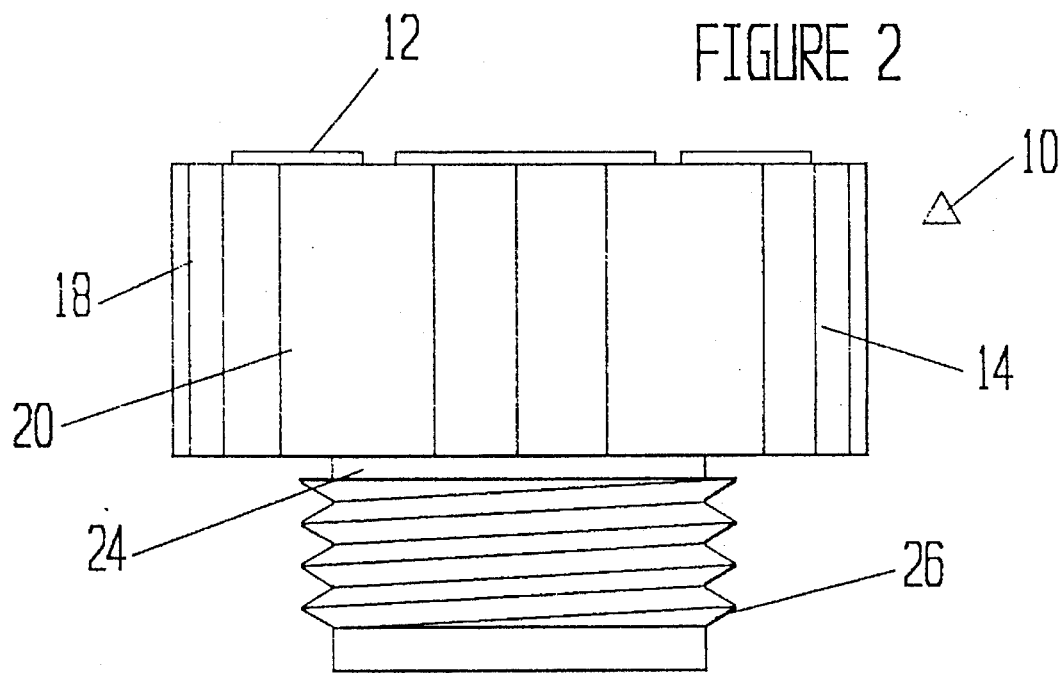
FIG. 2 is a side view of the quick connect/disconnect coupling of the invention.

Referring to FIGS. 1 and 2, the quick connect disconnect coupling 10 of the invention has a plurality of segmented jaws 12 circumferentially disposed about a body 24 and encircled by a surrounding retainer sleeve 14. The retainer sleeve 14 can have a plurality of axial grooves 18 on its outer surface 20 to enhance gripping. As an alternative, wrench flats or knurling can be provided on the outer surface 20 of the retainer sleeve 14. The body 24 of coupling 10 is shown with an externally threaded end 26 for removable attachment to conventional threaded conduits, couplings and the like.

Referring now to FIGS. 3 to 6, the segmental jaws 12 are shown in a circular array, as they are disposed about the body 24 of the coupling 10. A plurality of six jaws 12 are used, and each jaw 12 has an segmented circular shape with a wide circumferential groove 28 in its outer surface 30, thereby forming circular inner rim 32 and circular outer rim 34. The outer ends 36 of the jaws 12 are internally threaded to provide conduit gripping means, in the form of segmented internal helical threads 38 which, in assembly, provide an internally threaded assembly. Each jaw has an inner radial flange 52 at its inner end The body 24 of the coupling 10 is illustrated in FIGS. 7 and 8 with a sealing gasket 16 positioned off-center for illustration purposes. The body 24 has a circumferential groove 40 about its outer surface and located near its inner end 50. This groove 40 receives the inner radial flange 52 (see FIG. 4) at the inner ends of the jaws 12. As previously mentioned, the outer end 26 of the body 24 has external threads 54 for removable attachment to a threaded conduit. A conventional annular gasket 16 is received in an annular groove in the inner face 42 of body 24 to provide a fluid tight sealing of the assembly to a received threaded conduit.

An alternative body is shown in FIG. 9 which is useful for compression attachment to hoses. The body has the same inner end 50, with an external groove 40 and is used with a gasket 16, as previously described for body 24 shown in FIGS. 7 and 8. The hose compression body, however, has a reduced diameter shank 25 with a tapered reducing neck 23 to be received within a hose. The shank 25 has a distal shoulder 27 which is beveled, as shown, to permit its insertion into a hose, and expansion of the hose as it is forced over the shank 25.

The retainer sleeve 14 is shown in FIGS. 11–13. This retainer sleeve 14 encircles the assembly of jaws 12 and has a plurality of internal pins 56 adjacent its outer edge 58, one pin for each of the segmented jaws 12. The inner end 60 of the retainer sleeve 14 has an annular groove 62 about its inside wall to receive a retainer 63 which secures the entire assembly.

A conventional, and useful, retainer 63 is shown in FIG. 10. The retainer 63 has an inside diameter less than the inner diameter of the retainer sleeve, and is discontinuous to permit a resilient contraction for insertion into groove 62. For this purpose, a radial slit 65 is cut into a solid washer to form retainer 63, permitting the retainer to be inserted into the groove 62.

Each jaw 12 has an axial groove 66 (see FIGS. 5 and 6) in its outer segmented circular surface 68 which extends from the inner edges 70 of the jaws 12, to receive one of the pins 56 of the retainer sleeve 14. This groove has a stepped width, with a portion 72 having a greater width at the inner edge 70 of the jaw 12, thereby permitting a limited rotational movement of the retainer sleeve 14 in the assembly.

Figure 14:
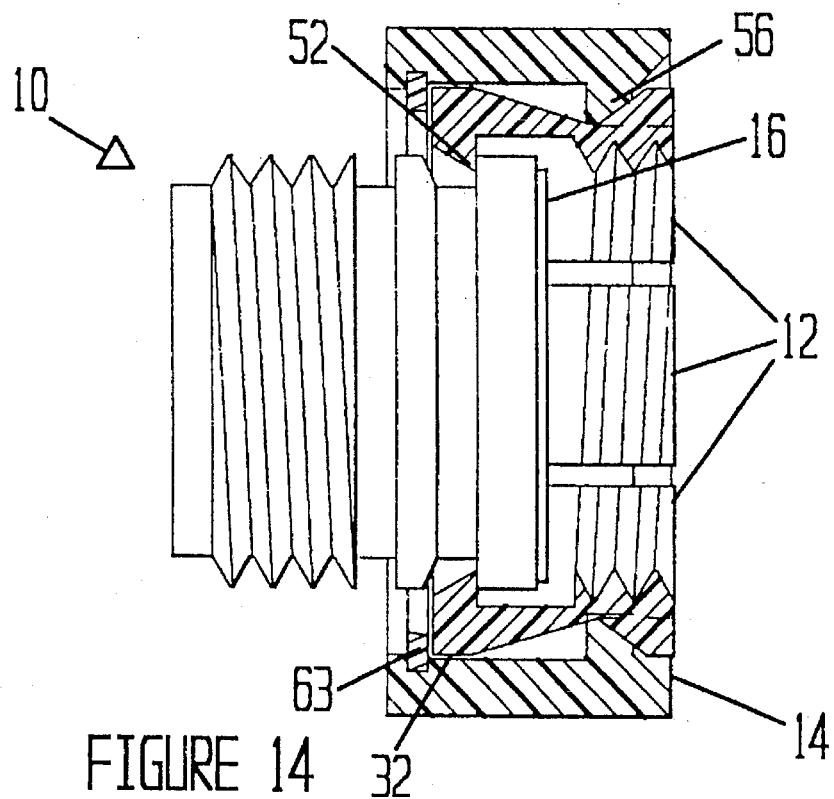
FIGS. 14 and 15 are sectional views of the quick connect/disconnect coupling of the invention in its closed and open configurations.
Figure 15:
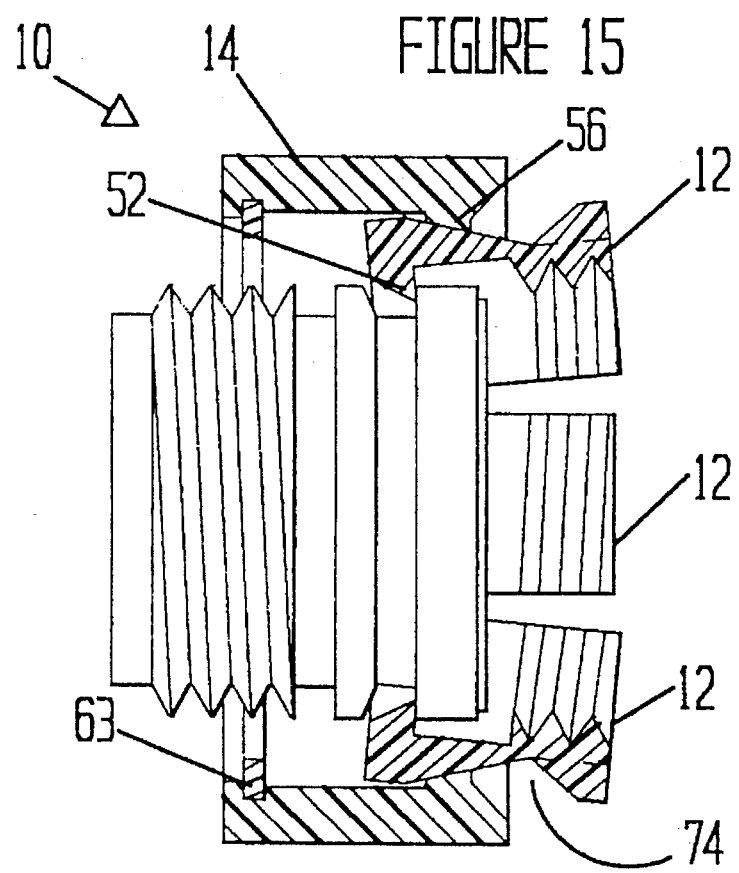

The assembled coupling 10 is shown in cross section in FIGS. 14 and 15. In FIG. 14, the retainer sleeve 14 is in its forward position with the jaws 12 in a conduit gripping configuration, with the rim 32 firmly seated against the inside surface of the retainer sleeve 14. In this position, the pins 56 in the narrow width portion of the axial grooves 66 on the exterior surfaces of the jaws 12. In this configuration, the coupling can quickly be tightened on a threaded conduit by rotational force applied to the retainer sleeve 14, compressing gasket 16 and sealing the connection.

When the ring 14 is retracted to the position shown in FIG. 15, the jaws 12 spread apart, releasing an engaged conduit. The annular groove 74 on the exterior surface of the jaws 12 clears the forward inside edges of the retainer sleeve 14, permitting the jaws 12 to pivot on the fulcrum edge of flange 52 of each jaw 12.. The rotation of the retainer sleeve 14 will lock the jaws 12 in the open configuration, thus aiding the application of the quick connect/disconnect coupling to a threaded conduit. Once the coupling has been placed on the threaded end of a conduit, the retainer sleeve 14 is rotated in a clockwise direction and pushed forward into the configuration of FIG. 13.

The quick connect/disconnect coupling of this invention can be readily manufactured with a minimum of assembly effort and skill. The jaws are simply placed over the body 24, the retainer sleeve is advanced over the jaws from their inner edges, with the pins aligned to enter the axial slots. Once in position, the retainer sleeve is permanently secured by inserting the retainer into the annular groove on the inside wall of the retainer sleeve, and cementing it in place with conventional plastic adhesives, or by solvent, ultrasonic or thermal welding.

The invention has been described with reference to the illustrated and presently preferred embodiment. It is not intended that the invention be unduly limited by this disclosure of the preferred embodiment. Instead, it is intended that the invention be defined by the means, and their obvious equivalents, set forth in the following claims.

I claim:

1. In a quick connect and disconnect coupling for connecting conduits which includes a hollow body having conduit attachment means on one end and an annular groove at its opposite end, an assembly of a plurality of closely spaced, segmented arcuate jaws, each having an outer segmented circular surface, an inboard radial flange adjacent its inner edge which is seated in said annular groove to provide pivotal mounting of said segments and conduit gripping means adjacent its opposite, outer edge, an external annular groove in said outer segmented circular surface, a cam ring having an outer face and an inner face and surrounding the assembly of jaws and axially slidable thereon between a rearward position opening said jaws and a forward position closing said jaws, the improvement comprising:

a. a plurality of pins, one for each of said jaws, spaced in equal angular increments about the interior wall of said cam ring adjacent its outer face;

b. an axial groove in the outer segmented circular surface of each of said jaws, said groove extending from the inner edge of said jaw, said axial grooves of said jaws receiving said pins in the assembly; and c. retainer means carried on the interior wall of said cam ring adjacent the inner face of said ring and having an inside diameter less than the outer diameter of said assembly of jaws.

2. The quick connect and disconnect coupling of claim 1 wherein said axial groove in each jaw has a stepped width, with a greater width at the inner edge of said jaw, thereby permitting a limited rotational movement of said ring between its rearward and forward positions.

3. The quick connect and disconnect coupling of claim 1 wherein said axial groove is centrally located on said outer segmented circular surfaces of said jaws thereby forming outer segmented circular lands at the inner and outer edges of said jaws.

4. The quick connect and disconnect coupling of claim 3 wherein said ring has an inner diameter slightly greater than the outer diameters of said circular lands to provide load bearing retention of said jaws in its forward position.

5. The quick connect and disconnect coupling of claim 1 wherein said conduit attachment means on said one end of said body comprise threads.

6. The quick connect and disconnect coupling of claim 1 wherein said conduit gripping means adjacent the opposite, outer edges of said jaws comprise internal threads.

7. The quick connect and disconnect coupling of claim 1 wherein said conduit attachment means on said one end of said body comprise a compression hose fitting.

8. The quick connect and disconnect coupling of claim 1 wherein said retainer means is a snap ring and including a snap ring annular groove on the interior wall of said cam ring adjacent its inner end which receives said snap ring.

* * * * *